UNITED STATES PATENT OFFICE.

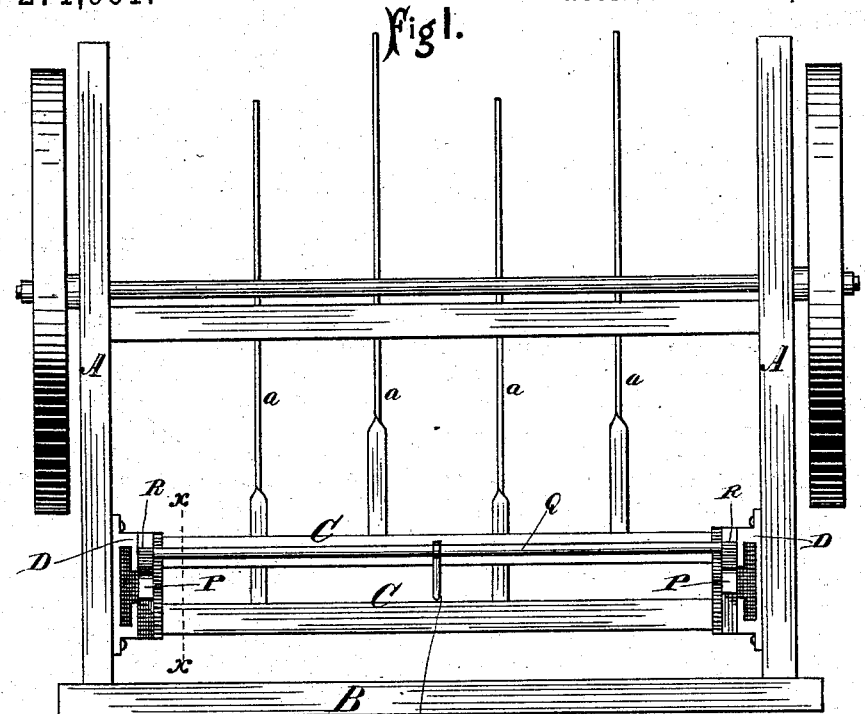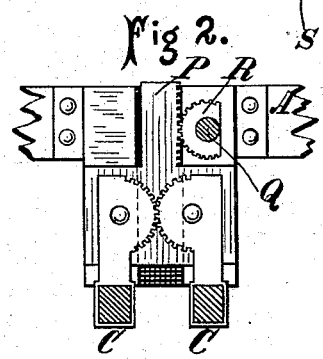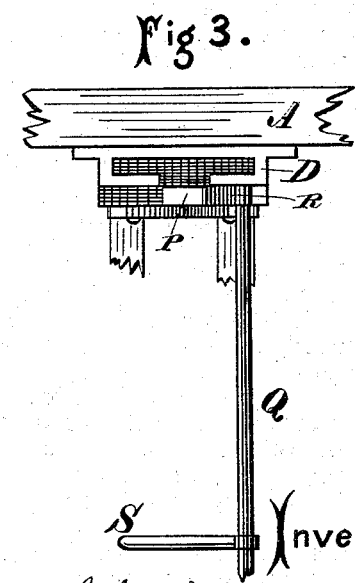

JOHN M. WESTCOTT, OF RICHMOND, INDIANA, ASSIGNOR TO THE HOOSIER DRILL COMPANY, OF SAME PLACE.

GRAIN SEEDING-MACHINE.

SPECIFICATION forming part of Letters Patent No. 271,961, dated February 6, 1883.

Application filed January 6, 1882, Renewed December 9, 1882. (No model.)

*To all whom it may concern:*

Be it known that I, JOHN M. WESTCOTT, a citizen of the United States, residing at the city of Richmond, in the county of Wayne and State of Indiana, have invented certain new and useful Improvements in Grain Seeding-Machines, of which the following is a specification.

My invention relates to the class of seeding-machines which employ drill-teeth or hoes attached to drag-bars; and the object of the invention is to afford improved facilities for regulating the depth that these hoes shall penetrate the soil.

Heretofore many different means have been employed for the accomplishment of this important object, but have all been more or less objectionable. One common method has been the employment of springs over the drag-bars, and another has been to change the pitch of the hoes and their standards by an adjustment of break-pins on the free ends of the drag-bars. Each of these methods has been found objectionable on account of their liability to get out of order, and because any inequality in the mellowness of the soil or unevenness in the path of the ground-wheels causes a variation in the depth of the drilling. Besides, as the pitch of each hoe has to be separately adjusted, much time is wasted. I overcome these objections and accomplish the objects of my invention by regulating the line of draft of the drag-bars, and this I do by a vertical adjustment of the cross bar or bars to which the drag-bars are attached in such a manner that the driver can readily accommodate the hoes to the various conditions of the soil to be drilled, and this without stopping or leaving his seat.

Figure 1 is a top view of so much of a grain-drill as is necessary to show my improvement. Fig. 2 is a vertical section through the line *x x* of Fig. 1; and Fig. 3 is an enlarged top view of parts of Figs. 1 and 2 which embody my invention.

A B represent the main frame of the machine, and *a a* ordinary drag-bars, attached to two rock-bars, C C, geared together, as clearly shown in Fig. 2; but I do not desire to limit myself to two rock-bars, as my improvement is equally as applicable to one as to two and to any of the well-known styles of bars.

D D represent brackets, attached to the side rails of the main frame, and are provided with grooves for the T-shaped tongues of the end caps, to which the cross-bars C C are attached to slide up and down in.

In the drawings I have shown a rack, P, and segment R, for giving vertical motion to the cross-bar heads or slides, the segments being connected by a rod, Q, which is provided with a lever, S, placed in such position as will be most convenient for the attendant, and which may also be provided with any ordinary retaining device.

It is obvious that by lowering the cross-bars the hoes will run deeper, and vice versa; but it is also obvious that, instead of the means of adjustment shown, others might be used with good effect—such as a rack and worm, or a chain and pulley, &c.—and therefore I do not desire to confine myself to the specific devices shown, as the benefits of the invention may be enjoyed without their use; but What I desire to claim, and secure by Letters Patent, is—

1. In a seeding-machine, the combination, substantially as herein described, of a vertically-adjustable bar, extending transversely across the forward portion of the machine, with a series of drag-bars having their front ends attached to said bar, the latter being under control of the attendant, whereby the front ends of all the drag-bars can be simultaneously and uniformly raised or lowered at any stage of the seeding operation.

2. In a seeding-machine, the combination, substantially as hereinbefore described, of a vertically-movable bar or bars extending transversely across the forward portion of the machine, a series of drag-bars having their front ends attached to said bar or bars, and mechanism, also connected with said bar or bars and under control of the operator, whereby the front ends of the drag-bars can be simultaneously and uniformly raised or lowered at any stage of the seeding operation.

In testimony whereof I have hereunto set my hand in the presence of two subscribing witnesses.

JOHN M. WESTCOTT.

Witnesses:
S. G. VANNEMAN,
HARRY L. WOODS.